INVENTORS
HIROSHI YAMAMOTO
KOICHI IKEDA
KATSUJI MINAGAWA

United States Patent Office 3,468,752
Patented Sept. 23, 1969

3,468,752
HERMETICALLY SEALED BODY OF CERAMIC, METAL AND GLASS AND METHOD THEREFOR
Hiroshi Yamamoto, Koichi Ikeda, and Katsuji Minagawa, Tokyo, Japan, assignors to Nippon Electric Company Limited, Tokyo, Japan, a corporation of Japan
Filed Oct. 12, 1965, Ser. No. 495,082
Claims priority, application Japan, Oct. 12, 1964, 39/58,102
Int. Cl. B32b 17/06
U.S. Cl. 161—196  5 Claims

ABSTRACT OF THE DISCLOSURE

A hermetically sealed body comprising a sintered body of ceramic formed of $MgO.SiO_2$ to which is sealed via a low melting glass a metal element, said sintered ceramic having contained therein a small but effective amount of free silica to confer a coefficient of thermal expansion corresponding substantially to the glass and the metal element over the range of approximately 95 to $105 \times 10^{-7}$ within the range of 30° C. to 255° C. and a method for making the same.

---

The present invention relates to a hermetically sealed body comprising ceramic, metal and glass.

It is generally required in sealing ceramic, metal, glass, etc. that the expansion coefficients thereof be relatively matched and the expansion characteristic curve of the glass intersect those of the metal and ceramics within the range of annealing temperature of the glass. Consequently, relatively limited characteristics are required in the usable combinations of ceramic, metal and glass. It is apparent that in a seal using a low melting glass, the limitation is more severe. In performing a seal with a low melting point glass of which the yield point is in the vicinity of 300° C. and the expansion coefficient is relatively high, i.e. in the order of $100 \times 10^{-7}/°$ C., it has been the practice to use a forsterite ceramic having the chemical composition $2MgO.SiO_2$ and an alloy referred to as a 52 alloy having the composition 52% Ni-48% Fe. The low melting point glass, however, is unstable, i.e. the expansion coefficient is susceptible to the affect of elevated temperature storage for a long period of time and devitrification is caused by such storage and hence in the sealing process the glass requires rapid cooling of the sealed body to the range of annealing temperature of the glass after heating at a high temperature for a short period of time, sometimes causing cracks in the forsterite ceramic. As the forsterite ceramic has a narrow range of sintering temperature, it is very difficult to sinter the ceramic with its expansion coefficient controlled within the specified range. It is also difficult to obtain good hermetic characteristics and mechanical strength when the expansion coefficient is specified. Accordingly, when forsterite ceramics are used, it has not only been difficult to obtain a perfectly sealed body, but also impossible to obtain a low cost sealed body, due to the expensive forsterite ceramic. It has been the practice to apply a thick glaze in sealing an assembly of ceramic, metal and glass. When such glazing is applied using a low melting point glass, it is required to quench the ceramic after glazing because of the instability of the low melting point glass, causing cracks to appear in such ceramics as the forsterite ceramic which has a high expansion coefficient and hence it is difficult to use such ceramics.

On the other hand, in the ceramics having a chemical composition of $MgO.SiO_2$, sintering is easier than in the forsterite ceramic, and the electrical characteristics of the ceramic are as good as those of the forsterite ceramic; however, the expansion coefficient of the former is so small that it has been impossible to use them in sealing with glass, though quenching causes no cracks therein.

Figure 1:
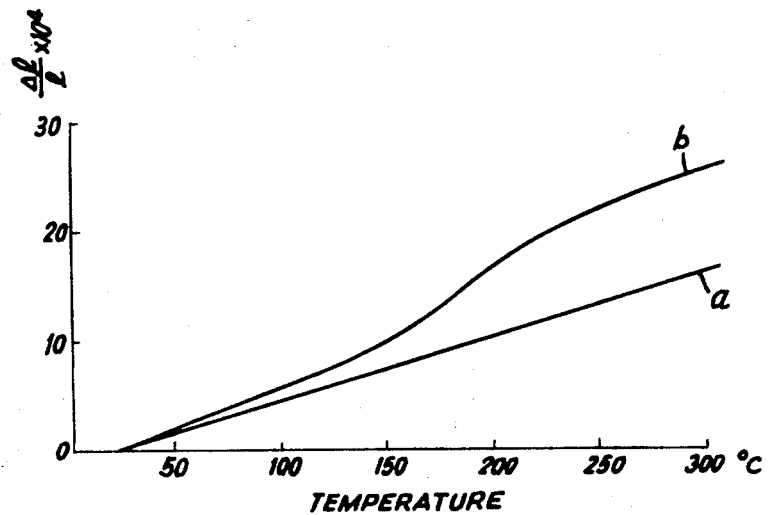
Figure 2:
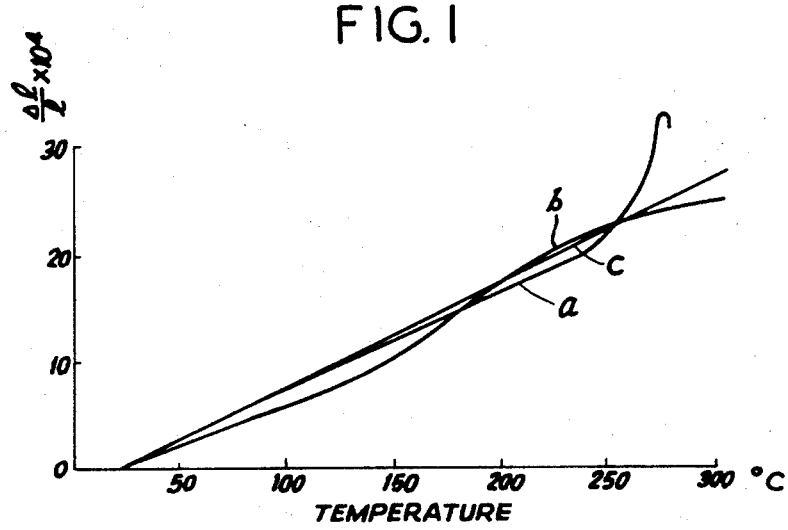
Figure 3:
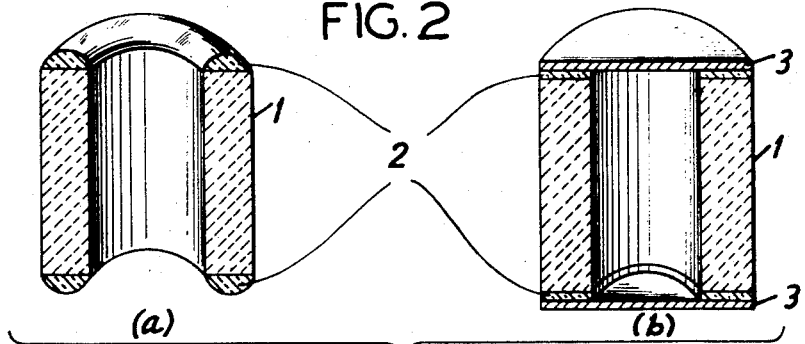

The objects of the invention will clearly appear from the following disclosure and the accompanying drawing wherein:

FIG. 1 shows the expansion characteristics of a ceramic of $MgO.SiO_2$;
FIG. 2 illustrates the expansion characteristics of a ceramic, glass and a nickel-iron alloy; and
FIGS. 3a and 3b are cross sections of a ceramic body produced by the invention.

The present invention provides a hermetically sealed body comprising ceramic, metal and glass, wherein the ceramic employed is economical and stable, using a steatite ceramic with a transformation point. The ceramic with a chemical composition of $MgO.SiO_2$ does not show a transformation point at a low temperature, but it is possible to change the expansion characteristics thereof from that represented by curve a to that represented by curve b having a transformation point as shown in FIG. 1 by adding a small but effective amount of free silica thereto to confer an expansion coefficient corresponding to the glass and to the metal. In FIG. 1, the ordinate is the expansion rate and the abscissa is the temperature. As can be seen in FIG. 1, the expansion coefficient in the temperature range of 30–255° C. is approximately $102 \times 10^{-7}$, enabling sealing with glass having an expansion coefficient around $100 \times 10^{-7}$ and a yield point around 300° C., while the expansion coefficient decreases above 255° C. as is shown in FIG. 1, enabling rapid temperature change at a high temperature without causing cracks. Not only do such ceramics as have a transformation point thereof have the same electrical characteristics as the forsterite, because the amount of silica is very small, but the sintering method is also far easier in the former than in the latter, hence the ceramics are much lower in cost. In the ceramics having a transformation point, the expansion characteristic curves a, b and c of the glass, the ceramic and the 52 alloy containing 52% Ni-48% Fe, respectively, intersect with each other within the annealing temperature of the glass, as shown in FIG. 2, and furthermore the expansion coefficient of the ceramic decreases to a very low value above the cross point, enabling rapid temperature change during the glazing of the low melting point glass and sealing without causing cracks, hence it is possible to obtain a stable sealed body. The present invention utilizes the aforementioned characteristics of having a transformation point due to which the ceramic could not be used as a sealing material.

The characteristics and objects of the present invention will now be described in reference to an embodiment.

EMBODIMENT 1

A sealed body of ceramic, the 52 alloy and the low melting point glass was prepared The expansion coefficients of the ceramic having a transformation point, 52 alloy and low melting point glass are as follows:

| Temperature range, °C | 30–230 | 30–255 |
|---|---|---|
| Ceramic | $103.7 \times 10^{-7}$ | $103.5 \times 10^{-7}$ |
| 52 alloy | $101.7 \times 10^{-7}$ | $103.4 \times 10^{-7}$ |
| Low melting point glass | $95.7 \times 10^{-7}$ | $103.7 \times 10^{-7}$ |

The yield point of the low melting point glass is 275° C. As will be appreciated, the materials have approximately the same expansion coefficients falling within the range of about 95 to about $105 \times 10^7/°$ C.

The sealed body comprises a cylinder 1 of the ceramic having glazing 2 on the upper and lower faces thereof, and plates or discs 3 of the 52 alloy attached to the upper and lower faces as shown in FIG. 3b. Such a sealed body can be obtained, for example, by glazing the upper and lower faces of a cylinder 1 of the ceramic by the low melting point glass as indicated by the numeral 2 in FIG. 3a, and cooling to room temperature, and further heating to 370° C. so as to effect a seal with the 52 alloy discs 3 at the upper and lower faces. After being cooled to room temperature, the body is then subjected to 5 cycles of thermal shock from 100–0° C., but no deterioration was detected.

As the ceramic used in the sealed body of the above embodiment has free silica added thereto, the expansion coefficient is $103.7 \times 10^{-7}$ up to 255° C., while the expansion coefficient in the range of 255–450° C. is $60.2 \times 10^{-7}$ which is much lower than the former. Accordingly, it is possible to obtain a stable sealed body without causing cracks during the glazing of the low melting point glass and sealing at high temperatures.

What is claimed is:

1. A method of producing a hermetically sealed body comprising an assembly of ceramic, metal and low melting glass which comprises, providing a metal element and a low melting glass having approximately the same coefficient of thermal expansion, blending with a ceramic material of $MgO.SiO_2$ a small but effective amount of free silica sufficient to provide a coefficient of thermal expansion approximately the same as that of the metal element and the low melting glass over the range of approximately 95 to about $105 \times 10^{-7}$ within the temperature range of about 30° C. to 255° C., forming a sintered hollow body of said blended ceramic material having an opening therein, and sealing said metal element at the opening of said body by applying a glaze of said low melting glass between the opening and said metal element by heating the assembly to the softening temperature of the glaze.

2. The method of claim 1, wherein the metal element is a nickel-iron alloy comprising approximately by weight of 52% nickel and approximately 48% iron.

3. A hermetically sealed body comprising a hollow sintered body of ceramic formed of $MgO.SiO_2$ with an opening to which is sealed via a low melting glass a metal element, said sintered ceramic having contained therein a small but effective amount of free silica to confer a coefficient of thermal expansion corresponding substantially to the glass and the metal element over the range of approximately 95 to $105 \times 10^{-7}$ within the range of 30° C. to 255° C.

4. The hermetically sealed body of claim 3 wherein the metal element is a nickel-iron alloy containing approximately 52% nickel and approximately 48% iron.

5. The hermetically sealed body of claim 4, wherein the yield point of the low melting glass is approximately 275° C., wherein the coefficient of expansion curves of the ceramic, the glass and the metal element over the temperature range of 30° C. to 255° C. mutually intersect each other within the annealing temperature range of the glass.

References Cited

UNITED STATES PATENTS 2,642,633   6/1953   Dalton _____ 161—196

OTHER REFERENCES

Hausner, Jour. Amer. Ceram. Soc., 29 (5), 123–28 (1946).

Partridge, Glass-To-Metal Seals, pub. by Soc. of Glass Tech., Sheffield, England (1949), pp. 8, 9, 13, 14 and 39.

ROBERT F. BURNETT, Primary Examiner

W. J. VAN BALEN, Assistant Examiner

U.S.Cl. X.R.

65—59; 106—39; 156—89; 161—193